US011393261B2

(12) United States Patent
Rafferty et al.

(10) Patent No.: US 11,393,261 B2
(45) Date of Patent: Jul. 19, 2022

(54) SYSTEMS AND METHODS FOR AUTOMATICALLY ADJUSTING A CABIN CLIMATE CONDITION

(71) Applicant: Toyota Motor Engineering & Manufacturing North America, Inc., Plano, TX (US)

(72) Inventors: John Charles Rafferty, Dexter, MI (US); Lou M. Pope, Ypsilanti, MI (US); Clinton J. Williams, Saline, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 342 days.

(21) Appl. No.: 16/263,926

(22) Filed: Jan. 31, 2019

(65) Prior Publication Data

US 2020/0250898 A1    Aug. 6, 2020

(51) Int. Cl.
*G07C 5/00*    (2006.01)
*B60H 1/00*    (2006.01)

(52) U.S. Cl.
CPC ......... *G07C 5/008* (2013.01); *B60H 1/00778* (2013.01); *B60H 1/00807* (2013.01);
(Continued)

(58) Field of Classification Search
CPC ......... B60H 1/22; B60H 1/00; B60W 30/192; B60W 10/30; B60W 10/26; B60W 20/00; B60W 50/00; B60W 50/08; F01N 3/20; F01N 9/00; H01M 10/625; H01M 10/48; B60R 16/37; B60L 9/00; B60L 11/00; B60L 11/18; B60L 1/02; G05D 1/00; G05D 3/00; G06F 7/00; G06F 17/00; F01P 7/16;
(Continued)

(56) References Cited

U.S. PATENT DOCUMENTS 5,553,121 A * 9/1996 Martin .................. H04M 3/493
379/88.01
9,104,537 B1 * 8/2015 Penilla .................. B60L 53/305
(Continued)

FOREIGN PATENT DOCUMENTS

JP    2017159691 A    9/2017

OTHER PUBLICATIONS

Audi Connect, https://www.audi-mediacenter.com/en/technology-lexicon-7180/infotainment-7183, published Feb. 17, 2017.

*Primary Examiner* — Jess Whittington
*Assistant Examiner* — Terry C Buse
(74) *Attorney, Agent, or Firm* — Dinsmore & Shohl LLP

(57) ABSTRACT

A system includes a sensor for sensing an outdoor environment weather condition of an outdoor environment, a processor, and a memory module communicatively coupled to the processor, the memory module including one or more processor-readable instructions that when executed, cause the processor to determine an expected departure time, determine the outdoor environment weather condition from data received from the sensor, and send a request for user input to a remote device, the request including a user input selector to initiate at least one climate control system based on one or more of the expected departure time and the outdoor environment weather condition.

14 Claims, 4 Drawing Sheets

(52) U.S. Cl.
CPC ...... *B60H 1/00392* (2013.01); *B60H 1/00742* (2013.01); *B60L 2240/34* (2013.01); *B60L 2260/56* (2013.01)

(58) Field of Classification Search
CPC .. B62D 1/06; B60N 2/56; F16H 57/04; G08C 17/00; G07C 5/00
See application file for complete search history.

(56) References Cited

U.S. PATENT DOCUMENTS

| | | |
|---|---|---|
| 9,275,501 B2 | 3/2016 | Gross |
| 9,589,455 B2 | 3/2017 | Nakagawa |
| 9,738,287 B2 | 8/2017 | Bolger et al. |
| 9,796,283 B2 | 10/2017 | Fink et al. |
| 2016/0244010 A1 | 8/2016 | Tseng et al. |
| 2017/0261331 A1* | 9/2017 | Shimizu ................ B60L 53/665 |
| 2018/0059913 A1* | 3/2018 | Penilla ................ G06F 3/04842 |
| 2018/0334170 A1 | 11/2018 | Liu et al. |
| 2019/0219412 A1* | 7/2019 | Melatti .............. G01C 21/3667 |

* cited by examiner

SYSTEMS AND METHODS FOR AUTOMATICALLY ADJUSTING A CABIN CLIMATE CONDITION

TECHNICAL FIELD

The present specification generally relates to systems and methods for operating a vehicle climate control system and, more specifically, to systems and methods for causing a climate control system to automatically adjust a cabin climate of a vehicle based on one or more of an external weather condition, a user preference, and a user request.

BACKGROUND

Vehicles may be exposed to harsh weather conditions and, while the cabin of a vehicle may be enclosed, a cabin temperature of a vehicle may equalize with an ambient temperature of the environment in which the vehicle sits over time. Thus, the cabin may be hotter or colder than preferred by a user. A user may desire that the cabin temperature be within a preferred range upon entrance to the vehicle cabin but may not be aware of an ambient temperature or weather condition before making way toward the vehicle, such as when the user leaves a home or an office building.

SUMMARY

In one embodiment, a system includes a sensor for sensing an outdoor environment weather condition of an outdoor environment, a processor, and a memory module communicatively coupled to the processor, the memory module including one or more processor-readable instructions that when executed, cause the processor to determine an expected departure time, determine the outdoor environment weather condition from data received from the sensor, and send a request for user input to a remote device, the request including a user input selector to initiate at least one climate control system based on one or more of the expected departure time and the outdoor environment weather condition.

In another embodiment, a vehicle includes a system configured to determine whether to send a prompt to a remote device. The system includes a sensor for sensing an outdoor environment weather condition of an outdoor environment, a processor, and a memory module communicatively coupled to the processor, the memory module including one or more processor-readable instructions that when executed, cause the processor to determine an expected departure time, determine the outdoor environment weather condition from data received from the sensor, and send a request for user input to the remote device, the request including a user input selector to initiate at least one climate control system based on one or more of the expected departure time and the outdoor environment weather condition.

In yet another embodiment, a method of initiating at least one climate control system in a vehicle using a sensor for sensing an outdoor environment weather condition, a processor, and a memory module that is communicatively coupled to the processor and includes one or more processor-readable instructions includes determining, by the processor, an expected departure time, determining, by the processor, the outdoor environment weather condition using the sensor, and sending, by the processor, a request for user input to a remote device, the request including a user input selector to initiate the at least one climate control system based on one or more of the expected departure time and the outdoor environment weather condition.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to systems and methods for automatically adjusting a cabin climate condition of a vehicle. The vehicle may include one or more components or systems configured to determine an ambient weather condition. For example, a vehicle may include thermometers, barometers, cameras, and other equipment that may determine an ambient weather condition. Additionally, vehicles may include internal clocks, calendar applications, and other applications or external connections that may contain or have access to information about the user's schedule. In one example, a vehicle system having an internal clock may log a time stamp each time the vehicle is started or stopped and the time stamps may be used to learn a user's schedule. In another example, a vehicle system may access a webmail or email server or a messaging application for text or image based data from which information about a user's schedule (e.g., appointment times and the like) can be determined. Such data may be used to predict a departure time and to calculate a time when it may become necessary to start a vehicle to have the cabin climate at a particular setting or settings based on the user's preference. Data about the user's schedule may be combined with data from one or more navigation applications, such as traffic or route data, and an estimated departure time could be generated. The estimated departure time may be, for example, a recommended time that the user should leave in order to make an appointment on time based on the appointment data and navigation data and the activation of various climate control systems could be based on this estimated departure time.

A vehicle may include one or more components or systems for generating a notification and sending the notification to a user. For example, the notification may be sent using one or more network interface hardware components. The notification may be sent, for example, to a user's smart device, such as a watch, a phone, or other portable electronic device, or to a webmail or other account. In embodiments, the notification may inform the user of inclement weather. In embodiments, the notification may request a user input that corresponds to one or more potential vehicle actions. Accordingly, a user may respond to the request for the user input and one or more vehicle actions may be based on the user input.

Figure 1:
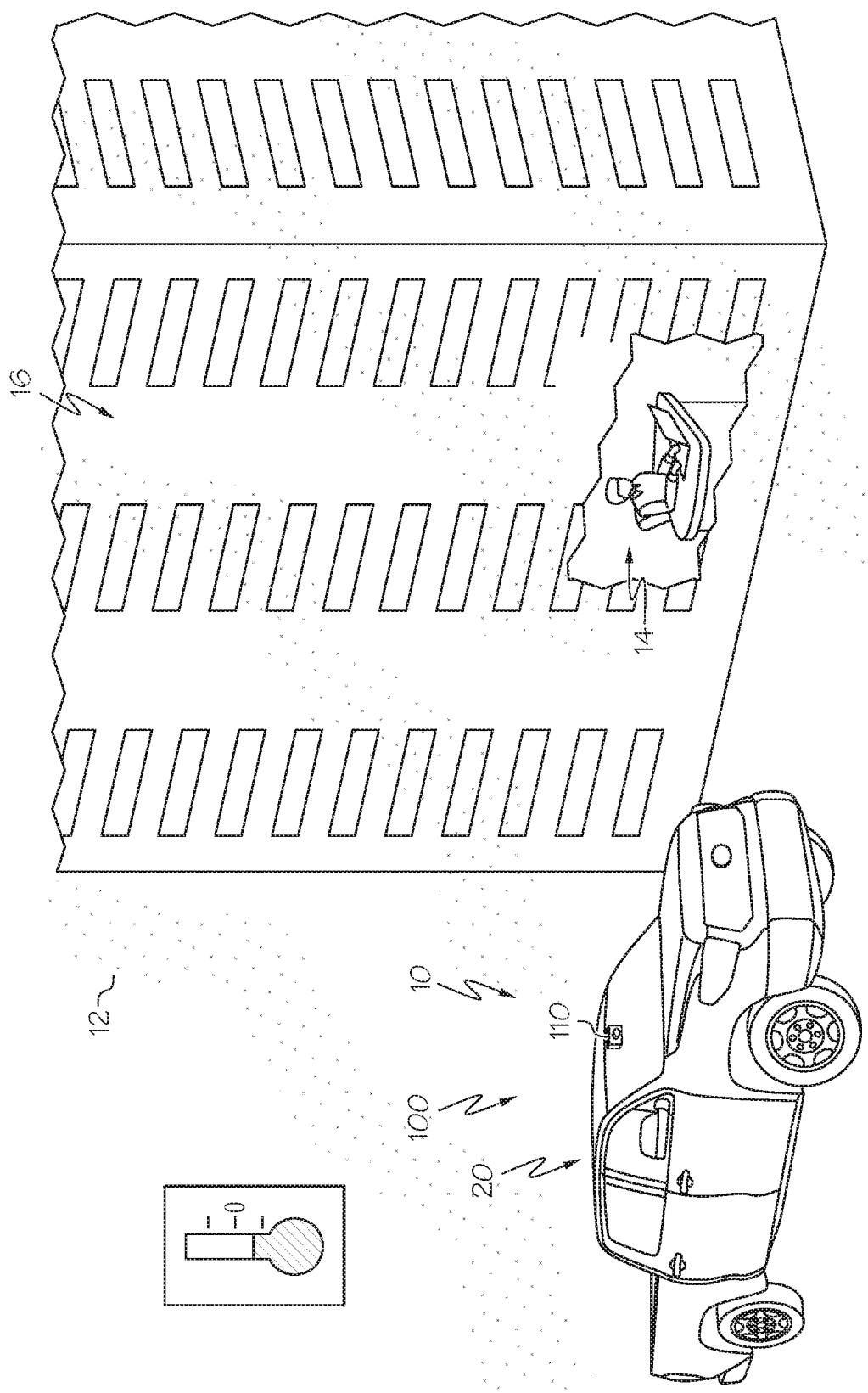
FIG. 1 schematically depicts a vehicle including an illustrative system for adjusting a cabin climate of the vehicle according to one or more embodiments shown and described herein.

Referring now to FIG. 1, a vehicle 10 including a system 100 for adjusting vehicle cabin climate based on user preferences is shown. The system 100 includes one or more components for determining one or more weather conditions and an expected departure time, and for generating a prompt to a user 14 based on one or more of the one or more weather conditions and the expected departure time that may include a user input request. The system 100 may make one or more changes to the cabin climate conditions based on the user input. The system 100 will now be described with reference to the figures.

Specifically, FIG. 1 shows the vehicle 10 including a cabin 20 and a camera 110 and may include other sensors that are configured to determine a weather condition of the outdoor environment as described in greater detail herein. For example, the camera 110 may obtain information relating to any existing precipitation (e.g., the snow 12), information relating to wet roads, information relating to outside temperature, and/or the like. The vehicle 10 may be associated with a particular user 14 via one or more user profiles that may be saved in a memory that is accessible by one or more onboard systems within the vehicle 10. A user profile may include various information about the user 14. For example, the user profile may include information about the user's preferred climate control preferences, may contain information relating to the user's schedule, and/or may contain information relating to the user's contact information, such as, for example, an email address, a phone number for text/SMS, voice messages, and the like. As used herein, an outdoor environment may refer to an external environment that is not within a structure such as a garage, a building, or other structure.

Figure 2:
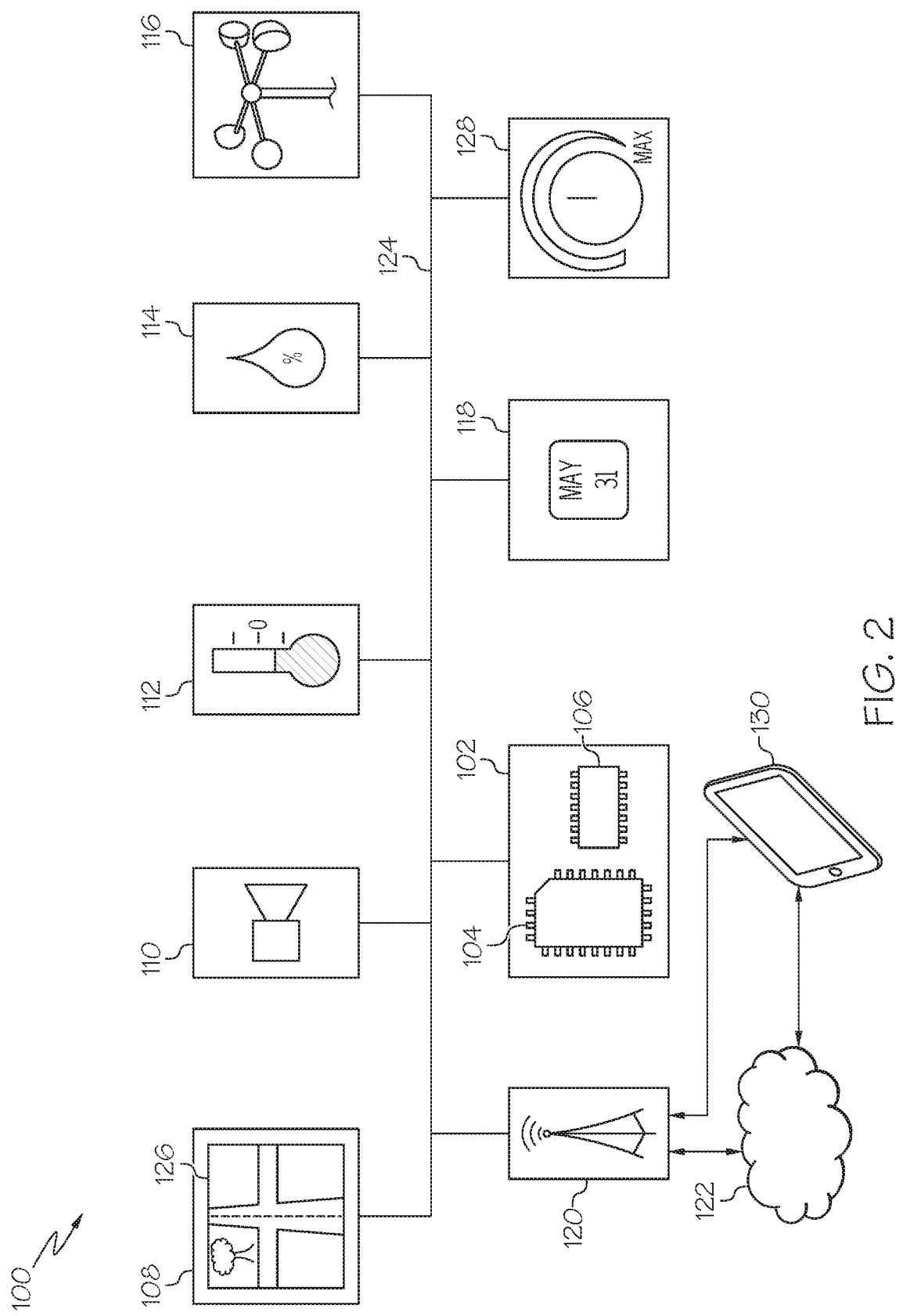
FIG. 2 schematically depicts illustrative internal components of a system for adjusting a cabin climate of a vehicle according to one or more embodiments shown and described herein.

Referring now to FIG. 2, the system 100 may include one or more internal hardware components. The system 100 includes an electronic control unit (ECU) 102 including a processor 104 and a memory module 106. The system further includes a navigation module 108, the camera 110, a temperature detector 112, a humidity detector 114, a wind gauge 116, a pattern-of-life module 118, network interface hardware 120, a climate control module 128 for controlling one or more climate control systems, and a display 126. In some embodiments, the network interface hardware 120 may communicatively couple the system 100 with an external network 122 (e.g., a cloud network) and/or one or more personal electronic devices, such as the personal electronic device 130. The various components of the system 100 may be communicatively coupled to one another via a bus 124.

The processor 104 may include any processing component(s) configured to receive and execute instructions. The instructions may be in the form of one or more processor-readable instructions or instruction sets stored in the memory module 106. Accordingly, the processor 104 may be an electric controller, an integrated circuit, a microchip, a computer, or any other computing device. The processor 104 is communicatively coupled to the other components of the system 100 via the bus 124. Accordingly, the bus 124 may communicatively couple any number of processors 104 with one another, and allow the components coupled to the bus 124 to operate in a distributed computing environment. In some embodiments, the bus 124 is a CAN bus. Each of the components may operate as a node that may send and/or receive data. Furthermore, while the embodiment depicted in FIG. 2 includes a single processor 104, some embodiments may include more than one processor 104 without departing from the scope of the present disclosure.

As noted above, the ECU 102 includes the memory module 106. The memory module 106 is communicatively coupled to the one or more processors 104. The memory module 106 may include RAM, ROM, flash memories, hard drives, or any device capable of storing processor-readable instructions such that the processor-readable instructions may be accessed and executed by the one or more processors 104. The processor-readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, and the like, that may be compiled or assembled into processor-readable instructions and stored on the memory module 106. In some embodiments, the processor-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

As noted above, the system 100 includes the bus 124. The bus 124 may be formed from any medium that is capable of transmitting a signal such as, for example, conductive wires, conductive traces, optical waveguides, or the like. Moreover, the bus 124 may be formed from a combination of mediums capable of transmitting signals. In one embodiment, the bus 124 includes a combination of conductive traces, conductive wires, connectors, and buses that cooperate to permit the transmission of electrical data signals to components such as processors, memories, sensors, input devices, output devices, and communication devices. Accordingly, the bus 124 may include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The bus 124 communicatively couples the various components of the system 100. As used herein, the term "communicatively coupled" means that coupled components are capable of exchanging data signals with one another such as, for example, electrical signals via conductive medium, electromagnetic signals via air, optical signals via optical waveguides, and the like.

In embodiments, the system 100 may include the navigation module 108. The navigation module 108 may be configured to obtain and update positional information of the vehicle 10 and to display such information to one or more users of the vehicle 10 (e.g., via the personal electronic device 130 and/or the display 126). The navigation module 108 may be able to obtain and update positional information based on geographical coordinates (e.g., latitudes and longitudes), or via electronic navigation where the navigation module 108 electronically receives positional information through satellites. In certain embodiments, the navigation module 108 may include a GPS system. In some embodiments, the navigation module 108 may be configured to obtain traffic data which may be used to determine when to send a request for user input, for example, to determine when a user needs to leave a particular location and hence, when to start the cabin climate systems in the vehicle 10. Traffic data may include information about the congestion of a thoroughfare (e.g., highway, street, road, and the like), about the congestion patterns, including expected and past congestion. Congestion patterns may be calculated, for example, over any period of time, for example, an hour, a day, a week, a month, etc. Traffic data may be obtained for example, using trilateration or GPS coordinates.

The navigation module 108 may be configured, for example, to determine an expected travel time from the current location of the vehicle 10 to an intended destination. An intended destination may be, for example, a location where one or more scheduled appointments, meetings, or other events are scheduled to take place as determined by one or more of a user input, a scheduling application, a learned pattern-of-life of the user, or the like. The expected travel time may be based on, for example, an expected speed from one location to another (e.g., the current location of the vehicle 10 to the appointment location) and the distance between the two locations. The expected travel time may be calculated for multiple routes between the two or more locations (e.g., through a number of waypoints). The expected travel time may be used in conjunction with other data (e.g., the appointment time, a user punctuality preference or user punctuality preferences, or the like) to determine a recommended departure time. The recommended departure time may be a suggested time for leaving one location in order to make it to a second location at a particular time. The recommended departure time may be calculated and communicated to a user using one or more of the systems described herein. In embodiments, the system 100 may send a notification to a user at a predetermined interval before the recommended departure time, informing the user of weather and other characteristics at the vehicle's location or, in some embodiments, along a travel route. The system 100 may request a user input in response to the estimated departure time and/or the recommended departure time. The user input may be used to, for example, adjust a cabin climate condition.

The camera 110 may be any device having an array of visual sensing devices (e.g., a CCD array, active pixel sensors, and the like) capable of detecting radiation in an ultraviolet wavelength band, a visible light wavelength band, or an infrared wavelength band. The camera 110 may have any resolution. The camera 110 may be an omni-directional imaging device or a panoramic imaging device. In some embodiments, one or more optical components, such as a mirror, fish-eye lens, or any other type of lens may be optically coupled to the camera 110. It should be understood that where the camera 110 or other systems described herein are described with respect to "image data" or an "image," such language encompasses "video data" or a "video." The camera 110 may be communicatively coupled to a display, for example, as components of a tablet computer, a smartphone, wearable glasses or the like. The camera 110 may also be a standalone device.

The processor 104 may process the image data captured by the camera 110 using one or more image processing algorithms. Any known or yet-to-be developed video and image processing algorithms may be applied to the image data in order to identify an item, situation, or person. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The weather sensors (i.e., the temperature detector 112, the humidity detector 114, and the wind gauge 116) may be capable of detecting one or more weather conditions in the outdoor environment (e.g., a temperature, humidity, and wind speed/direction, respectively). In embodiments the weather sensors may be analog or digital sensors capable of generating one or more signals. The temperature detector 112 may be, for example, a thermocouple or a thermoresistor. In some embodiments, the signals generated by the weather sensors may be used as inputs to one or more other systems or components. For example, the processor may process a signal received from the weather sensors and may adapt a cabin climate condition, generate a notification to a user, and/or take other actions based on the weather signal. The weather sensors may have external and internal components. For example, one or more temperature detectors 112 may be positioned within the vehicle to determine a cabin temperature and/or outside the vehicle 10 to determine an external temperature. Additionally, one or more humidity detectors 114 may be positioned within the cabin to determine a humidity level within the cabin and/or outside the vehicle 10 to determine a humidity level outside the vehicle 10.

The pattern-of-life module 118 is a data processing component that tracks (i.e., records and processes data) appointments, recurring events, and/or behavioral patterns of a user or users of the system 100. The pattern-of-life module 118 may track communications to and from a user or users of the vehicle 10 that include information about appointments and behavioral patterns of the user or users. The pattern-of-life module 118 may measure and record average travel times (including departure and arrival times), wait times, and/or idle times, for example. In embodiments in which the vehicle 10 is an electric vehicle, the pattern-of-life module 118 may measure average battery charge times to determine when a user may expect to leave a location with a full battery charge. In some embodiments, the pattern-of-life module 118 may predict a battery discharge along a route to determine whether a charge is sufficient to get from one place to another or to factor in additional charging stops along a route. In embodiments, the pattern-of-life module 118 may display and/or communicate appointments and appointment updates to the user or users and suggest and create appointments based on routine behaviors and patterns-of-life of the user or users of the vehicle 10. In some embodiments, the pattern-of-life module 118 may scrape user communications and automatically generate appointments and/or appointment updates. For example, the pattern-of-life module 118 may be configured to access a web-based mail server or message server (e.g., an SMS server) of the user or users and may access the web-based mail server or message server to automatically populate the calendar of a user or users. The functions of the pattern-of-life module 118 may be implemented as one or more computer-readable instruction sets stored in the memory module 106 that, when executed by a processor (e.g., the processor 104) cause the system to perform as described herein.

In some embodiments, the pattern-of-life module 118 may be configured to connect to one or more external processors or memories, for example, via the bus 124 that conducts one or more machine learning algorithms for learning a user's schedule. For example, the external network 122 may be configured to send and receive data from the vehicle 10. One or more decision trees, weight-majority algorithms, contextual inference algorithms, Bayesian or Naïve Bayesian algorithms, neural networks such as recurrent neural networks or artificial neural networks, hierarchical preference models, natural language processing, and other algorithms for determining a user's calendar and predicting departure times based on the user's calendar may be performed and this data may be shared with the system 100 onboard the vehicle 10. In some embodiments, a user or another entity external to the system may input his or her own appointments directly into the pattern-of-life module 118, which may take one or more physical manifestation, such as one or more graphical user interfaces (GUIs), which may be used to display calendar information on, for example, the display 126. In other embodiments, the system 100 may automatically update the pattern-of-life module 118 with expected appointments based on a connection with, for example, the personal electronic device 130. In embodiments, the user may confirm the appointments, for example, by answering a query generated by the system 100 or an external system or by selecting one or more appointments and confirming them using a GUI. In embodiments, the system 100 may automatically confirm various appointments. In some embodiments, the system 100 may assign or receive a confidence score to a potential appointment based on one or more factors, for example, the number of times a user has attended such an event, other events on the user's schedule, contact information of other individuals that may be associated with the event, etc. The confidence score may be used to either confirm the appointment or to keep the appointment in a cue for requesting confirmation, or for declining the appointment.

The pattern-of-life module 118 may interface with the navigation module 108, for example, to determine an anticipated departure time based on an appointment location, an appointment time, a distance to the appointment, an expected travel time to the appointment location (e.g., based on traffic congestion, refueling/recharging, and the like), and other user preference as described in greater detail herein.

The pattern-of-life module 118 may be configured to process data (e.g., calendar data, scheduling data, location data, etc.) to determine a user's punctuality preferences. The user's punctuality preferences may include information regarding a user's preferred or usual arrival or departure preferences for appointments in the user's calendar. For example, if a user is habitually fifteen minutes early for scheduled appointments, the pattern-of-life module 118 may utilize one or more of the machine learning algorithms described herein to determine that the user prefers to be early for appointments and may adjust the recommended departure time accordingly. In other embodiments, the pattern-of-life module 118 may determine punctuality preferences on appointment characteristics, for example, appointment type, an expected list of appointment attendees, or other appointment characteristics. For example, if a user has a preference for being early to appointments scheduled with a particular person or group or groups of persons, the pattern-of-life module 118 may apply a punctuality buffer, for example, and inform the user five minutes earlier than normal that he or she should leave for their appointment and request a user input as to the cabin climate as described herein. In other embodiments, the punctuality preferences may be based on the type of appointment. For example, a user may prefer to be early to doctor's appointments, job interviews, work shifts, or the like, but may have no strong preference for being early for recreational activities, such as, for example, golf outings. It is to be understood that punctuality preferences could be applied, if at all, for any reason based on user preferences.

The network interface hardware 120 may be communicatively coupled to the ECU 102 via the bus 124. The network interface hardware 120 may be any device capable of transmitting and/or receiving data with external vehicles or servers directly or via a network, such as an external network 122. Accordingly, network interface hardware 120 can include a communication transceiver for sending and/or receiving any wired or wireless communication. For example, the network interface hardware 120 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 120 may include hardware configured to operate in accordance with the Bluetooth wireless communication protocol and may include a Bluetooth send/receive module for sending and receiving Bluetooth communications.

In some embodiments, the system 100 may be communicatively coupled to a network such as the external network 122. In embodiments, the external network 122 may include one or more computer networks (e.g., a cloud network, a personal area network, a local area network, grid computing network, wide area network, and the like), cellular networks, satellite networks, mesh networks, and/or a global positioning system and combinations thereof. Accordingly, the system 100 can be communicatively coupled to the external network 122 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The display 126 may be any device capable of visually displaying images, for example, images captured by the camera 110 or generated by the navigation module 108. The display 126 may include any medium capable of transmitting an optical output such as, for example, a cathode ray tube, light emitting diodes, a liquid crystal display, a plasma display, or the like. Moreover, the display 126 may be a touchscreen that, in addition to providing optical information, detects the presence and location of a tactile input upon a surface of or adjacent to the display 126. Accordingly, the display 126 may receive mechanical input directly upon the optical output provided by the display 126. Additionally, it is noted that the display 126 can include at least one processor and a memory component. The display 126 may be a tablet computer, a smartphone, a lens or other display component in a pair of augmented reality glasses, or the like. While the particular embodiment shown in FIG. 2 shows the display 126 within the navigation module 108, it is to be understood that this is merely illustrative and the display 126 may be a separate component of the system 100 that is capable of receiving an input from any other system or component.

The climate control module 128 may include one or more cabin climate control systems such as, for example, an HVAC system, seat heaters, mirror or glass heaters (e.g., a rearview window heater), an ignition condition, a window position and/or a sunroof/moonroof position, and other aspects of the vehicle 10 that may affect the internal climate of the vehicle 10. For example, the climate control module 128 may affect the position of the windows of the vehicle 10 based on a user input (e.g., to roll them down during particularly hot weather, up in case of precipitation, and the like). As another example, the climate control module 128 may start the vehicle 10 and/or start the HVAC system to cool or heat the vehicle 10 in response to a user input. In some embodiments, the climate control module 128 may be configured to determine one or more user climate control preferences. The user cabin climate preferences may include a user's preferred aspects of a cabin climate within the vehicle 10. For example, the cabin climate preferences may include information about preferred temperatures, preferred air conditioning settings, preferred window settings, preferred seat heater settings, preferred windshield wiper settings, preferred temperature differences between an outdoor environment and the cabin, etc. The cabin climate preferences may be stored, for example, in the memory module 106.

Figure 3:
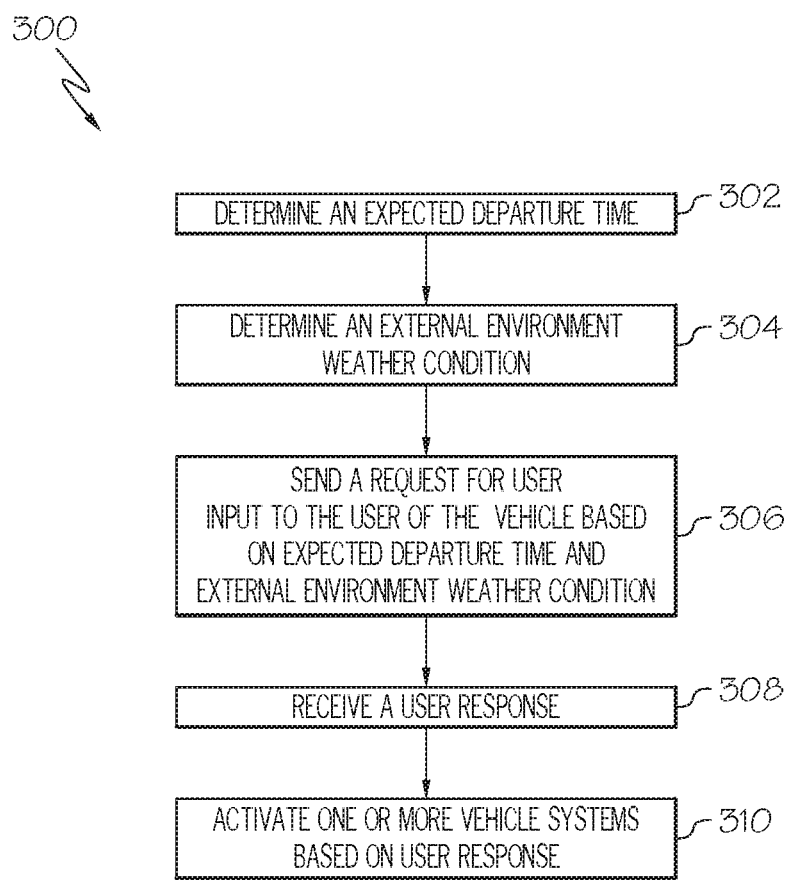
FIG. 3 depicts a flow diagram of an illustrative method of generating a user input request and adjusting a cabin climate condition based on a user input according to one or more embodiments shown and described herein.

FIG. 3 depicts a method 300 of generating a user input request and adapting a cabin climate condition based on a user input. While the particular embodiment shown in FIG. 3 depicts five steps, it is to be understood that embodiments may include more or fewer steps, including alternate steps to those shown. The method 300 may be executed based on instructions stored in the memory module 106 that are executed by the processor 104.

At block 302, system 100 may determine an expected departure time. The expected departure time is the time that the user of the vehicle is expected to depart in the vehicle in order to go to a second location. The expected departure time may be based on data generated or processed by the system 100. For example, data may be processed by one or more of the navigation module 108 and the pattern-of-life module 118 to determine the expected departure time. The expected departure time may be based on information contained in an electronic communication or appointment reminder that is accessible through one or more email servers, text message servers, or other applications. In some embodiments, the expected departure time may be based on a time stamp that is recorded each time a vehicle is turned on and turned off. For example, the system 100 may record a time stamp each time the vehicle 10 is turned on or off and the system may learn when to expect the engine to turn on or off using one or more of the machine learning techniques described herein.

In some embodiments, the expected departure time may be adjusted based on user punctuality preferences. For example, the user may prefer to arrive for a doctor's appointment fifteen minutes early. The system 100 may determine from, for example, a scheduling application on a device of the user that an upcoming appointment is a doctor's appointment and may determine to send a notification fifteen minutes earlier than it would for a different type of appointment. The expected departure time may also be adjusted based on the weather conditions. For example, the expected departure time may be automatically adjusted plus or minus a certain number of minutes based on a weather condition as detected by the one or more external sensors.

At block 304, the system 100 may determine an outdoor environment weather condition. For example, the system 100 may capture one or more images of the outdoor environment and process the one or more images using one or more of the data processing algorithms described herein to determine an external weather condition. For example, the system may determine whether precipitation exists (e.g., snow, sleet, hail, rain, and the like). In some embodiments, the system 100 may determine whether fog exists or not by capturing an image of the outdoor environment. Additionally, in some embodiments, the system 100 may use data from systems, components, or networks that may be used to determine an outdoor environmental condition. For example, a web-based weather service may be used to determine a condition of the outdoor environment (e.g., temperature, precipitation, and the like). Accordingly, weather at any location may be taken into account to determine the outdoor environment weather condition. For example, if the vehicle 10 is at a first location and it is determined that the vehicle 10 will travel to a second location based on, for example, information determined by the pattern-of-life module 118, the vehicle 10 may use the outdoor environment weather condition at the second location to adjust one or more climate control preferences as described in greater detail herein. In some embodiments, sensors may be used to determine whether the vehicle is indoors or outdoors and one or more system responses may be based on whether the vehicle is indoors or outdoors. For example, an engine of the vehicle 10 may not start if the vehicle 10 is indoors (e.g., within a garage of a home).

In some embodiments, the outdoor environment weather condition may be compared to an internal condition of the vehicle and one or more actions of the system 100 may be based on the difference between the cabin climate and the outdoor environment. For example, the system 100 may include one or more inputs from an internal thermometer (e.g., a cabin temperature detector) similar to the temperature detector 112 that is configured to determine the temperature of a cabin of the vehicle 10. The system 100 may use the temperature detector 112 and the internal thermometer to determine a temperature difference between the outdoor environment and an interior of the vehicle 10 and the determination as to whether to send a request for user input may be based on the temperature difference. In some embodiments, the system may learn (e.g., using one or more of the machine learning algorithms described herein) how long it takes for an internal condition of the vehicle 10 (e.g., temperature, humidity, and the like) to reach a particular internal condition (e.g., the user's preferred temperature, humidity, and the like) and may base the timing of the request for user input on the time it takes to reach the particular conditions. The time to reach a particular condition may be based on the starting conditions of the cabin and accordingly, the internal condition sensors are necessary to determine this timing as well.

At block 306, the system 100 may send a request for user input to the user of the vehicle based on the expected departure time and the weather condition. For example, before the expected departure time, the system 100 may send a request to the user requesting a user input with regard to activating a particular climate control system. The request for user input may be a text-based message, for example. The request may request a user input in the form of a yes or no question. For example, the system 100 may generate a message for sending over an SMS system such as, "Would you [the user] like to initiate the climate control system of your vehicle? Respond Y/N." The user may respond via an SMS response, for example. That is, the user may respond by typing "Y" or "N" into a messaging app on his or her device and send the message to the system 100.

In some embodiments, the request to the user may include an image or other information (e.g., temperature, humidity level, precipitation status, etc.) of the outdoor environment. For example, in embodiments in which the system 100 captures an image of the outdoor environment, the system 100 may send the image to the user in a message (e.g., via MMS, a web-based messaging service, or the like) in the request for the user input. For example, the system may send an image over a messaging service including a message, "Here is an image of the outdoor environment. [Image]. Would you like to initiate the climate control system of your vehicle? Respond Y/N." This may help inform the user in making a decision as to whether or not to commence operation of the climate control system. The user can then respond to the message to start the climate control system or not based on his or her preference. For example, the user may text a reply "Y" or "N."

At block 308, the system 100 may receive the user input. The user input may cause one or more changes to cabin climate control systems based on the user's response. For example, if the user responds "Y" to the request for user input, the system 100 may start an HVAC system of the vehicle 10 and begin cooling or heating the cabin of the vehicle 10 after determining whether heating or cooling is needed.

In some embodiments, the system 100 may be configured to understand additional responses provided by the user. That is, a user may specify certain details about initiating the system 100 or particular components thereof and the system 100 may discern the details. For example, the system 100 may be configured to understand a reply that states, "Start the fan in five minutes, but do not start the engine or the air conditioning compressor." In some embodiments, the system 100 can be configured to default to automatically start one or more climate control systems in response to sending a request for user input and receiving no response to such a request. That is, if the user receives a request for user input and fails to respond, the system may be configured to start the system in spite of no response or to not start the system until or if a response is received by the system 100. Accordingly, in some embodiments, starting the system may be based on a "human-in-the-loop" algorithm. A human-in-the-loop ("HTL") algorithm is an algorithmic model that requires human interaction giving the user greater autonomy over the cabin climate preferences.

In some embodiments, the system 100 may send a user input request that requests information about the user's preference for starting particular systems. For example, the system 100 may send a message that states, "Do you want your seat heater started? Reply Y/N." The user may then reply appropriately based on his or her preference for activating a seat heater. The system 100 may learn the user's cabin climate control preferences over time and may send general requests such as, "Do you want your normal climate control preferences established within the vehicle? Reply Y/N"

Additionally, the system may learn a user's average response time to a request for user input and may base the timing of sending the request for user input on the user's average response time. For example, if a user takes three minutes to respond to a request for user input from the vehicle on average, the vehicle 10 may send a request for user input three minutes before it otherwise starts the climate control systems in order to have the cabin at the user's preferred conditions when the user arrives and/or takes other action. In some embodiments, the system 100 may be configured to determine whether the user has received, read, or otherwise opened the message from the system 100. For example, in a text-message based system, the vehicle 10 may send a text message to a user and the user may not open the message. In such a case, the vehicle 10 may or may not automatically start the climate control systems that were suggested in the text message.

If the user replies to a request from the vehicle 10, the vehicle 10 may activate one or more climate control systems based on the user's response at block 310. The vehicle 10 may start, for example, one or more of an HVAC system, a seat heater, a window heater, a mirror heater, and/or the like based on the user's response to the request for user input. The cabin climate conditions may change based on the activation of the one or more systems. In embodiments, the system 100 may activate all of the user's preferred climate control systems simultaneously or may activate one or more of the systems individually as necessary to have the cabin at or near the user's preferred conditions at a predetermined time (e.g., when the user enters the cabin or at the expected departure time). For example, if the vehicle requests a user's input five minutes before the expected departure time based on an expected response lag of three minutes and a need of two minutes for the cabin conditions to reach the user's preferred conditions but the user replies to the request for user input unusually early, the system may wait to start some or all of the climate control systems. The system 100 may wait, for example, until it is necessary for the systems to be started such that the cabin of the vehicle 10 is at the user's preferred conditions when the user enters the vehicle 10 (i.e., the expected departure time).

Figure 4:
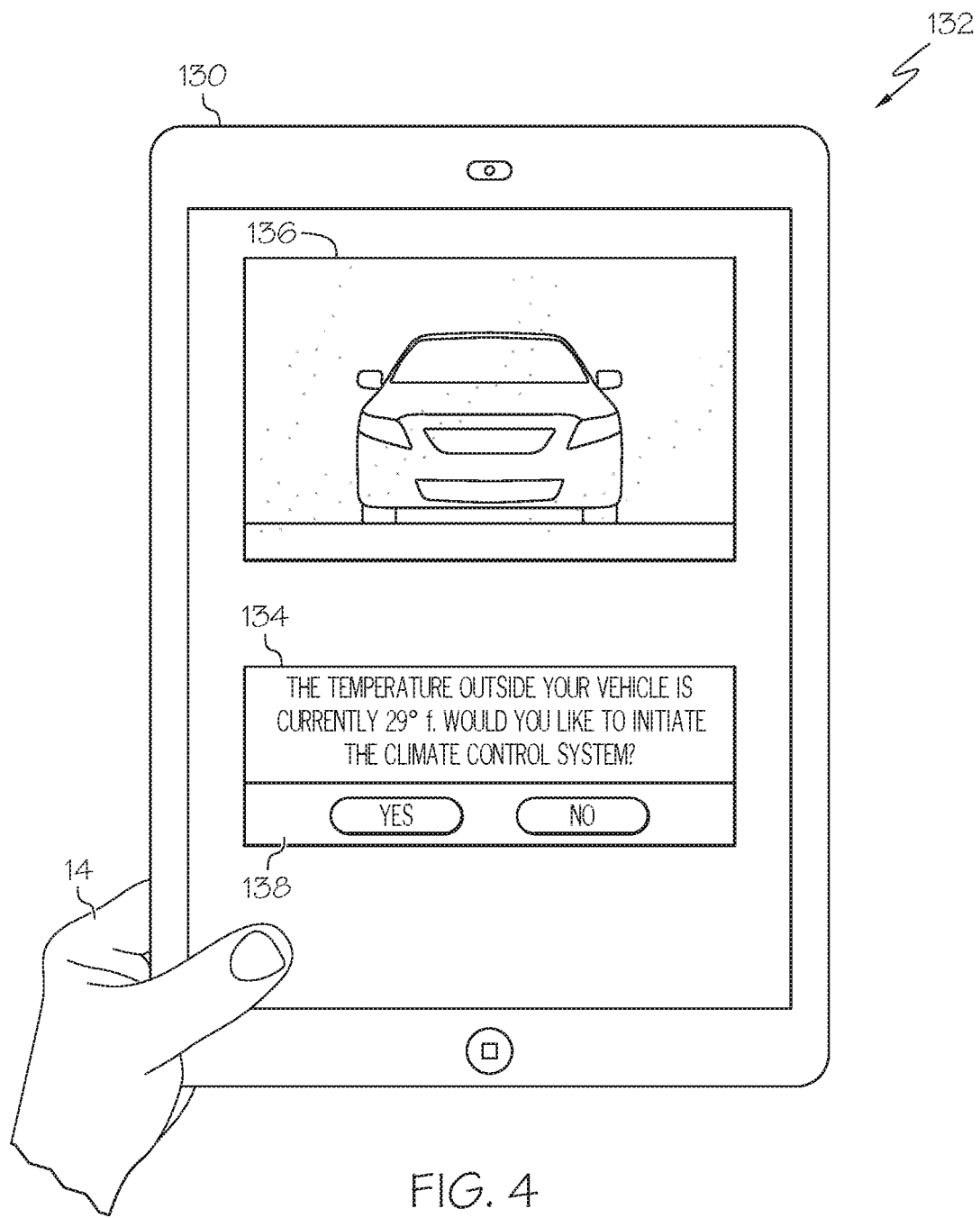
FIG. 4 depicts an illustrative user interface that provides a notification to a user for adjusting a cabin climate of a vehicle according to one or more embodiments shown and described herein.

Referring now to FIGS. 1 and 4, an exemplary embodiment of the method described with respect to FIG. 3 is shown. As shown in FIG. 1, the user 14 may be working in an office building 16. The user 14 may have his or her vehicle 10 parked outside the office building 16, wherein snow 12 may be falling and a cabin temperature of the cabin 20 may match a temperature of the outdoor environment such that the cabin temperature would be uncomfortable to the user 14. In the particular example embodiment of FIG. 1, the ambient air temperature outside the office building 16 is below freezing as indicated by the thermometer 18. FIG. 4 shows a personal electronic device 130 of the user 14 of FIG. 1. The personal electronic device 130 may be a remote device and may display a message 132 that may include a text-based portion 134 and an image 136. The message may be generated, for example, by the system 100 of FIGS. 1 and 2 and sent to the personal electronic device 130 of the user 14. As shown in FIG. 1, the user 14 may be working on a normally schedule workday and the user 14 may routinely leave work at, for example, 5:15 PM.

In the example scenario depicted in FIGS. 1 and 4, the system 100 onboard the vehicle 10 may determine that an expected departure time as described above at some point prior to the vehicle 10 starting in the parking lot of the office building 16 to drive the user back home (e.g., when the vehicle 10 is parked in the morning). The expected departure time may be determined based on, for example, an average departure time as determined by the most usual start time of the engine of the vehicle 10. In some embodiments, the expected departure time may be input to the system 100 by the user him or herself each day. In some embodiments, the system 100 may determine the expected departure time based on information contained in an application, such as, for example, a calendar or messaging application of the user 14.

At some point before the expected departure time, the vehicle 10 may use one or more sensors (e.g., one or more of the sensors described herein) to determine an outdoor environmental condition. The system 100 may use, for example, the camera 110 to determine that it is snowing outside. The system 100 may use the temperature detector 112 to determine that a temperature is below freezing, for example. In embodiments, the system 100 may use one or more of the humidity detector 114 and the wind gauge 116 to determine an outdoor environment condition. The outdoor environment condition may be determined, for example, with one or more connections with one or more external networks or systems. For example, the outdoor environment condition may be determined based on information from one or more Internet-based weather services. As another example, the vehicle 10 may receive weather information from one or more other vehicles, for example, via a vehicle-to-vehicle (V2V) connection. In other embodiments, the vehicle 10 may receive information from one or more external networks via a vehicle-to-infrastructure (V2I) or a vehicle-to-anything (V2X) connection.

As shown in FIG. 4, the vehicle 10 may send the message 132 to the user 14. The message may read, for example, "The temperature outside your vehicle is currently 29 degrees F. Would you like to initiate the climate control system?" In some embodiments, the message may include the image 136. In the particular example shown in FIG. 4, the image shows snow falling outside the vehicle 10. The message 132 may inform the user 14 of the particular weather conditions. The text-based portion 134 may include the user response section 138, which may include a user input selector including one or more options for responding to the message 132. In the particular example shown, the user response section 138 includes two responses, "Yes," and "No," but it is contemplated that embodiments of the system 100 may be capable of determining other user responses and of taking various actions based on the various user responses as described herein. In the example embodiment, the user 14 may respond to the message 132 by pushing, for example, one of the user responses in the user response section 138. Once the user answers the message 132, the vehicle 10 may initiate one or more climate control features of the vehicle 10.

It should now be understood that a system for generating a user input request and adapting a cabin climate condition based on a user input may be used to affect the cabin of a vehicle before a user enters the vehicle. The system may make a cabin more comfortable based on user preferences and may be based, at least in part, on a user input. The user input may be in response to a request for user input that may include information about the outdoor environment around the vehicle and may include information about the cabin climate of the vehicle itself. Accordingly, a user may make an informed decision to initiate various climate control systems, increasing his or her comfort level and may enjoy a better, more adaptable vehicle experience.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
    a sensor to capture an image of an outdoor environment;
    a processor; and
    a memory module comprising one or more processor-readable instructions that, when executed, cause the processor to:
        determine a first time that it takes for an internal condition of a vehicle to reach a particular internal condition based on user preferences;
        determine an outdoor environment weather condition of the vehicle based on the captured image;
        determine an expected departure time based on the determined outdoor environment weather condition; and
        send a request for user input to a remote device at a timing based on the determined outdoor environment weather condition and the determined first time, the request comprising the captured image and a user input selector to initiate at least one climate control system based on one or more of the expected departure time and the outdoor environment weather condition.

2. The system of claim 1, wherein the one or more processor-readable instructions, when executed, further cause the processor to:
    determine a user punctuality preference, wherein
    the expected departure time is based on the punctuality preference of the user.

3. The system of claim 1, further comprising a temperature detector that senses a temperature of the outdoor environment and the request for user input includes the temperature of the outdoor environment.

4. The system of claim 3, further comprising a cabin temperature detector configured to determine a temperature of a cabin of a vehicle, and wherein the request for user input is based on a temperature difference between the temperature of the outdoor environment and the temperature of the cabin.

5. The system of claim 1, wherein the one or more processor-readable instructions, when executed, cause the processor to:
    receive a user input and to activate one or more cabin climate control systems based on the user input.

6. A vehicle comprising:
    a system configured to automatically adjust a cabin climate condition of the vehicle, the system comprising:
        a sensor on the vehicle to capture an image of an outdoor environment;
        a processor; and
        a memory module comprising one or more processor-readable instructions that, when executed, cause the processor to:

determine a first time that it takes for an internal condition of the vehicle to reach a particular internal condition based on user preferences;

determine an outdoor environment weather condition of the vehicle based on the captured image;

determine an expected departure time based on the determined outdoor environment weather condition; and send a request for user input to a remote device at a timing based on the determined outdoor environment weather condition and the determined first time, the request comprising the captured image and a user input selector to initiate at least one climate control system based on one or more of the expected departure time and the outdoor environment weather condition.

7. The vehicle of claim 6, wherein the one or more processor-readable instructions, when executed, further cause the processor to:

determine a user punctuality preference, wherein
the expected departure time is based on the punctuality preference of the user.

8. The vehicle of claim 6, further comprising a temperature detector that senses a temperature of the outdoor environment and the request for user input includes the temperature of the outdoor environment.

9. The vehicle of claim 8, further comprising a cabin temperature detector and wherein the one or more processor-readable instructions further cause the processor to:

determine a temperature of a cabin of the vehicle, and wherein the request for user input is based on a temperature difference between the temperature of the outdoor environment and the temperature of the cabin.

10. The vehicle of claim 6, wherein the one or more processor-readable instructions, when executed, cause the processor to:

receive a user input and to activate one or more cabin climate control systems based on the user input.

11. A method of initiating at least one climate control system in a vehicle using a sensor for capturing an image of an outdoor environment, the method comprising:

determining a first time that it takes for an internal condition of a vehicle to reach a particular internal condition based on preferences of a user;

determining, by the processor, an outdoor environment weather condition of the vehicle based on the captured image;

determining, by the processor, an expected departure time based on the determined outdoor environment weather condition; and sending, by the processor, a request for user input to a remote device at a timing based on the determined outdoor environment weather condition and the determined first time, the request comprising the captured image and a user input selector to initiate the at least one climate control system based on one or more of the expected departure time and the outdoor environment weather condition.

12. The method of claim 11, further comprising determining, by the processor, a user punctuality preference, wherein the expected departure time is based on the user punctuality preference.

13. The system of claim 1, wherein the one or more processor-readable instructions, when executed, cause the processor to:

determine an outdoor environment weather condition at a second location different from a first location of departure from data received from the system; and send the request based on the outdoor environment weather condition at the second location.

14. The system of claim 1, wherein the one or more processor-readable instructions, when executed, cause the processor to:

determine a user's prior response time to the request for user input; and send the request for user input based on the user's prior response time.

* * * * *